(12) United States Patent
Lewis (10) Patent No.: US 6,512,863 B1
(45) Date of Patent: Jan. 28, 2003

(54) SCALABLE OPTICAL SWITCH (75) Inventor: Warren Hale Lewis, Sunnyvale, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/662,500

(22) Filed: Sep. 14, 2000

Related U.S. Application Data (63) Continuation-in-part of application No. 09/215,440, filed on Dec. 18, 1998, now abandoned.
(60) Provisional application No. 60/153,981, filed on Sep. 14, 1999.

(51) Int. Cl.[7] .............................................. G02B 6/35
(52) U.S. Cl. ............................. 385/18; 385/33; 385/47
(58) Field of Search ............................. 385/15–18, 31, 385/33, 46, 47

(56) References Cited

U.S. PATENT DOCUMENTS 5,361,315 A * 11/1994 Lewis et al. ................... 385/16
5,661,827 A * 8/1997 Lewis et al. ................... 385/18
5,719,972 A * 2/1998 Caron et al. ................... 385/18
5,940,552 A * 8/1999 Lewis et al. ................... 385/18

* cited by examiner

*Primary Examiner*—Frank G. Font
*Assistant Examiner*—Michael P Mooney
(74) *Attorney, Agent, or Firm*—Synnestvedt & Lechner LLP

(57) ABSTRACT

A scalable optical switching device comprising: (a) an input optical fiber; (b) a plurality of output optical fibers; (c) a rigid concave spherical mirror; and (d) at least one planar refractive plate located between the input fiber and the mirror and shiftable between a first position and a second position wherein the refractive plate has a thickness dimension in the direction through which a light beam from the input optical fiber passes and an index of refraction that are selected to transmit the light beam to and from the mirror through the refractive plate to different output optical fibers when the refractive plate is switched between the first position and the second position.

6 Claims, 7 Drawing Sheets

1X8 Switch Schematic

Switching by Moving Mirror

FIG. 1
PRIOR ART

Rotating 'Refractive Plate' shifts reflected beam

Reference Plate Switching

FIG. 2

2X2-Bypass Switch Imaging

FIG. 3a

Dual 2X2-Bypass Switch Imaging

FIG. 3b

Imaging by a curved mirror. The point(x,y,z) is imaged to the point(-x,-y,-z) with a mgnification of 1.

FIG. 4

Use of a moving mirror to make a 1X2 switch.

An array of 6 fibers coupled using a single curved mirror.
In state(a), the following fibers are coupled: 1⇔5, 2⇔4, 3⇔3.
In state(b) the following fibers are coupled: 1⇔6, 2⇔5, 3⇔4.

FIG. 6b

Propagation of light from a point source through a single refractive plate. The dashed lines indicate the apparent location of the rays as viewed from the right side of the plate.

FIG. 7

A single plane refractive plate and a curved mirror used to make a refractive switch. In state(a) light from the center fiber is imaged to the topmost fiber. In state(b)(not shown) light from the center fiber is switched to the bottommost fiber.

FIG. 8

1X8 Switch Schematic

FIG. 9

A 1X16 refractive plate switch incorporating 4 refractive plates which have thicknesses which are in the ratio of 1:2:4:9

SCALABLE OPTICAL SWITCH

This application is a Contiuation Part of Ser. No. 09/215,440 filed Dec. 18, 1998 now abandoned; which claims benefit of No. 60/153,781 Sep. 14, 1999.

FIELD OF INVENTION

This invention relates generally to optical switches and, more specifically, to opto-mechanical optical switches.

BACKGROUND OF INVENTION

Robust, high performance optical switches are necessary for route diversity, for dense wavelength division multiplexing (DWDM) switchable add/drop multiplexing, and for optical cross-connects [OXC]. Although solid state approaches such as thermo-optic switches appear attractive, they suffer in insertion loss and crosstalk performance when compared with opto-mechanical solutions. For systems requiring intermediate switching speeds for reconfiguration, rerouting, and route protection, opto-mechanical fiber optic switches can provide the right mix of cost and reliability. For OXC applications, opto-mechanical switches can also offer scalability to a practical level.

Figure 1:
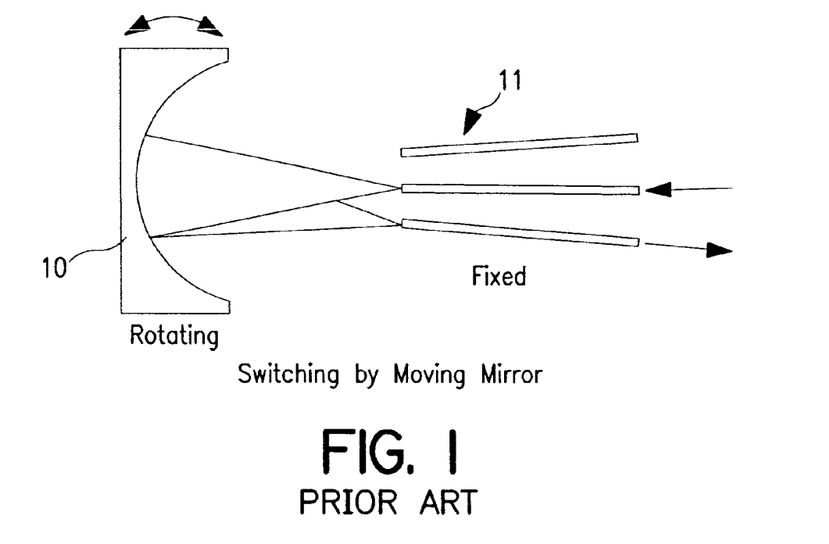
FIG. 1 is a schematic diagram of a prior art approach of opto-mechanical switching in which switching between fibers is effected by moving the mirror.

One approach for opto-mechanical fiber optic switches is a centro-symmetric reflective [CSR] imaging and switching device. Unlike other opto-mechanical switches which use a combination of GRIN lenses and interposing prisms or mirrors to effect switching, this device uses a single concave spherical mirror to image the light from an array of fibers. Developed in 1978 the CSR approach provides one-to-one imagery and is achromatic and diffraction limited, providing the object and image are not too far from the axis of the reflector. As shown in FIG. 1, a rotating single concave spherical mirror 10 effects rotating switching among an array of fibers 11. This approach has been used in generations of multi-mode optical bypass switches. This approach reduces the complexity of the optical system and allows all of the optical paths to be controlled with common optical elements, while—providing the point-to-point imaging necessary for low insertion loss.

Although this approach is effective for multi-mode switching, it is generally considered unsuitable for single-mode switching. More specifically, in single-mode switching, the mechanical slop in the pivot assembly causes an unacceptable amount of loss fluctuation when the mirror is the moving part. Therefore, there is a need for a fiber switching device for single-mode applications which offers the benefits of opto-mechanical switching but does not suffer from the imprecision traditionally associated with opto-mechanical switching devices.

SUMMARY OF INVENTION

The present invention provides a highly-precise, opto-mechanical approach for fiber switching that avoids mechanical play in the pivot assembly of the mirror by keeping the mirror stationary and instead moving one or more refractive plates interposed between the mirror and the array of fibers to shift the light beams between the fibers and the mirror and thereby effect the desired switching among the fibers. This approach reduces the number of mechanical degrees of freedom which negatively affect the optical image positions, thus easing manufacturing and alignment tolerances. Additionally, this approach enables the sensitivity of the system to the rotation of the refractive plane to be tuned by varying the dimensions of the refractive plate. Another advantage of using plane plates is that the displacement of the image is independent of the x,y,z position of each plate, thus, only the tilt of the plates matter. This is a significant advantage when the switch is thermally cycled.

The opto-mechanical switching approach of the present invention is particularly advantageous for more complex applications than protection switching, such as OXC, where it is necessary to scale simple 1×2 switches to larger configurations. While solid-state switches and some opto-mechanical switches are generally scaled by creating tree structures of 1×2 switches, this typically means switch losses are additive. Compared to switches based on an individual lens for each fiber, the approach of the present invention can be scaled to 1×N with much greater economy of both cost and insertion loss by simply increasing the number of refractive plates.

Accordingly, one aspect of the invention is an opto-mechanical switching devices that effects switching through the movement of refractive plates interposed between the mirror and the fiber array. In a preferred embodiment, the device comprises: (a) an input optical fiber; (b) a plurality of output optical fibers; (c) a rigid concave spherical mirror; and (d) at least one planar refractive plate located between the input fiber and the mirror and shiftable between a first position and a second position wherein the refractive plate has a thickness dimension in the direction through which a light beam from the input optical fiber passes and an index of refraction that are selected to transmit the light beam to and from the mirror through the refractive plate to different output optical fibers when the refractive plate is switched between the first position and the second position.

DETAILED DESCRIPTION OF THE INVENTION

Figure 2:
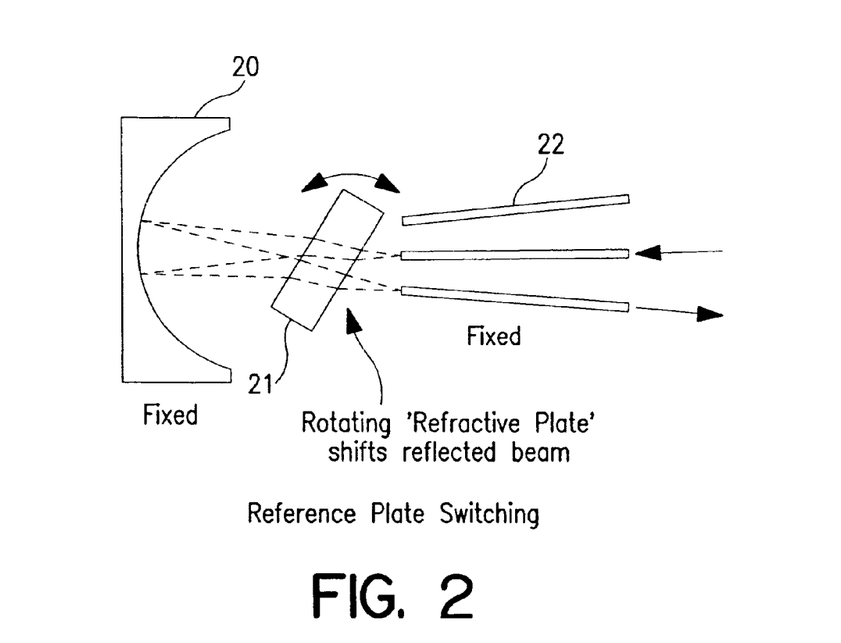
FIG. 2 is a schematic diagram of the opto-mechanical switching approach of the present invention in which switching between fibers is effected by moving a refractive plate while keeping the fiber array and the mirror stationary.

In the opto-mechanical switching device of the present invention, the mirror 20 is rigidly fixed and the beam is shifted using a rotatable plane refractive plate 21 as shown in FIG. 2. Preferably, the fibers 22 are aligned as a group, thereby further simplifying manufacturing. Precise positioning of the fibers in the array can be accomplished, for example, by precisely etching V-grooves in a silicon substrate. In a preferred embodiment, the rotating refractive plate is actuated electromagnetically. This affords bistable switching [i.e. latching in either position] with no power needed in either position. In other words, switching to the opposite position is effected by a short pulse of the opposite polarity. Therefore, in the embodiment of FIG. 2, by means of one moving part, both 1×2 and 2×2 bypass switching can be accomplished.

Figure 3A:
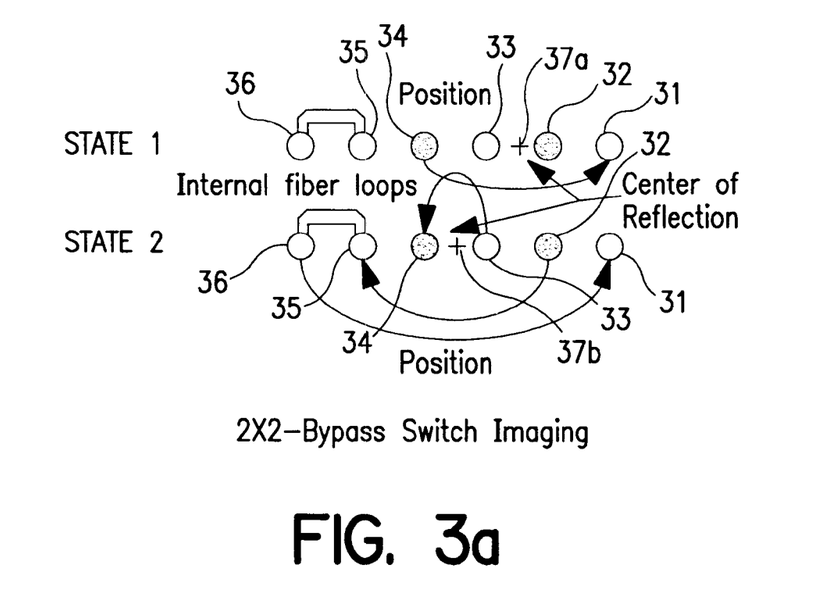
FIG. 3a illustrates 2×2-bypass switching in accordance with the present invention.

The two imaging positions of a 2×2 "fixed" bypass switch are depicted schematically in FIG. 3a. This figure shows an end view of an array of six fibers, 31, 32, 33, 34, 35, 36 (note that fibers 35 and 36 form an internal loop) in two different states (State 1 and State 2). In State 1, fiber 34 is coupled to fiber 31. By changing the center of reflection from 37a to 37b, State 2 is effected in which: (a) fiber 32 is coupled to fiber 35 which in turn loops and couples fiber 36 with fiber 31; and (b) fiber 33 is coupled to fiber 34.

Figure 3B:
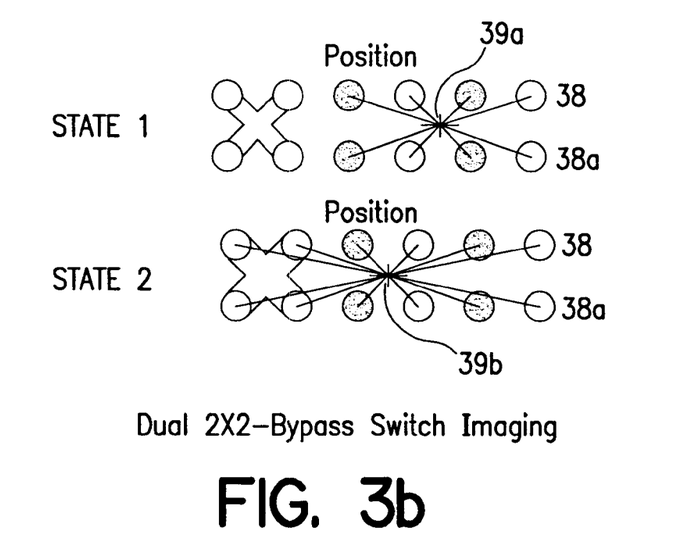
FIG. 3b illustrates dual-2×2-bypass switching in accordance with the present invention.

Multiple fiber arrays can share the same optical system to realize parallel switches. For example, double-pole, single-throw switches or dual-2×2-bypass switches can be fabricated using the same mirror and actuator, as shown in FIG. 3b. Switching between the parallel arrays of fibers, 38, 38a to effect State 1 and State 2 is accomplished by changing the center of reflection from 39a to 39b.

A more detailed analysis of the refractive plate switching as used in the present invention will now be undertaken. A refractive plate switch consists of a single curved mirror and one or more plane refractive plates. The system can best be understood by first considering the action of a curved mirror and a refractive plate independently.

Figure 4:
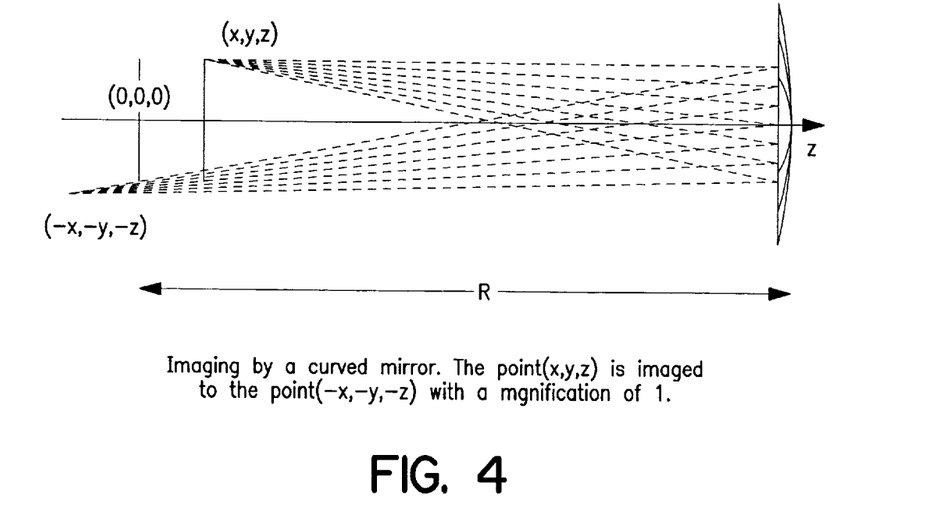
FIG. 4 illustrates magnification using a curved mirror in which the point (x,y,z) is imaged to the point (−x,−y; z) with a magnification of one.

A source placed at the center of curvature of a mirror will be imaged back upon itself. For purposes of discussions herein, the z axis is perpendicular to the mirror at some point, and an origin is at a distance R from the mirror surface, where R is the radius of curvature of the mirror. If the source is displaced from this origin by an amount (x, y, z) as is shown in FIG. 4, then an image will be formed at the point (−x, −y, −z) with a magnification which is one, providing x, y, and z are all much less than R. This property can be used to make a switch by moving the mirror (either translating or rotating) so that the optical axis is different for two or more switch positions.

Figure 5:
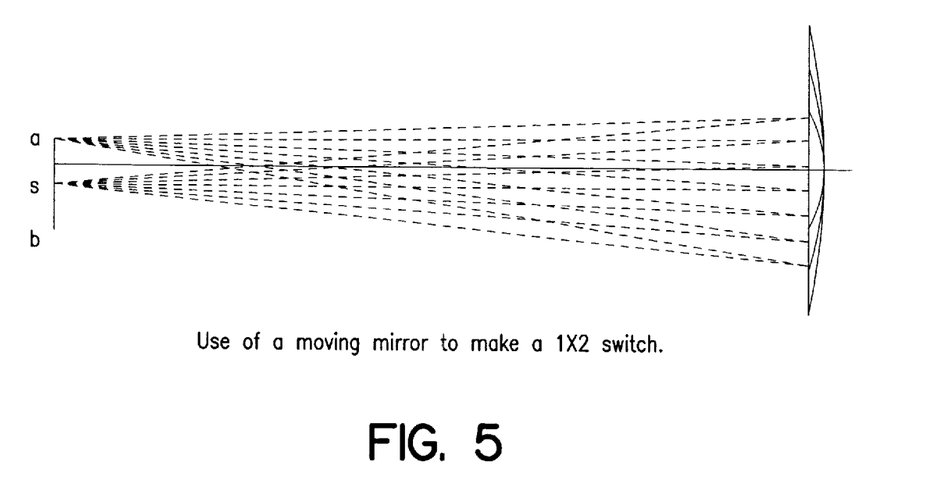
FIG. 5 illustrates the use of a moving mirror to make a 1×2 switch.

This is illustrated in FIG. 5 where one fiber input is switched between two outputs. When the mirror axis is midway between the source s and the receiver a, light from the source is coupled into receiver a. Similarly, the path of the light may be switched to receiver b by moving the mirror axis midway between s and b (not shown).

Figure 6A:
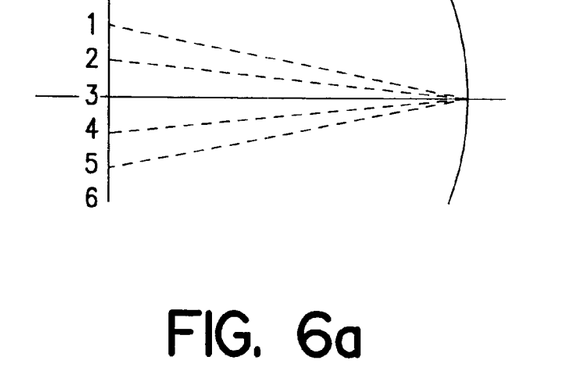
FIGS. 6(a) and (b) illustrate an array of six fibers coupled using a single curved mirror.
Figure 6B:
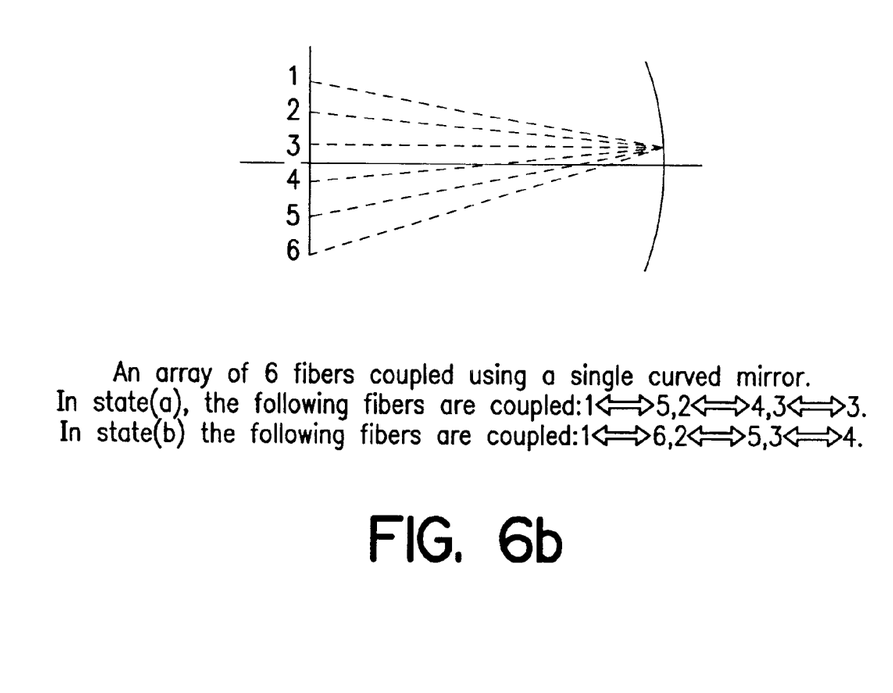

To minimize the coupling loss, the fibers must be arranged in an array such that the optical axes of all the fibers converge at a common point located at the plane of the mirror. FIGS. 6(a) & (b) show an array of six fibers for two mirror positions or states and demonstrates that many interconnections are made simultaneously for each position of the mirror. More specifically, in state (a), the following fibers are coupled: 1&5, 2&4, and 3&3. In state (b) the following fibers are coupled: 1&6, 2&5, and 3&4.

Figure 7:
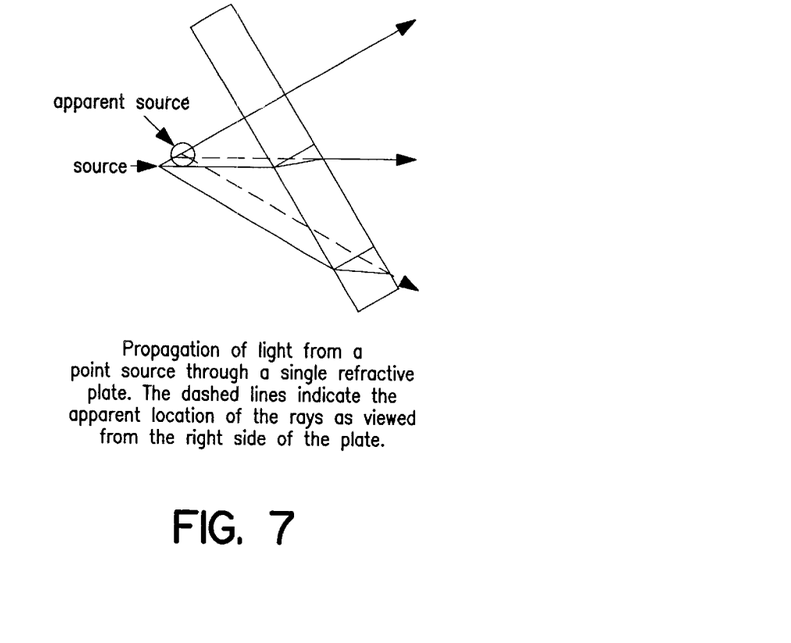
FIG. 7 illustrates propagation of light from a point source through a single refractive plate.

A plane refractive plate acts on each ray of light from a source, translating the apparent source point of origin of the ray without affecting the angle at which the ray propagates, as is shown in FIG. 7. The dashed lines indicate the apparent location of the rays as viewed from the right side of the plate. Placing a plate in a region where the light is not collimated introduces aberrations which degrade the performance of the switch. These aberrations may be minimized under the following conditions: when the NA of the source is small; when the plates are thin; when the tilt of the plates is small; and when the index of refraction of the plates is high.

Figure 8:
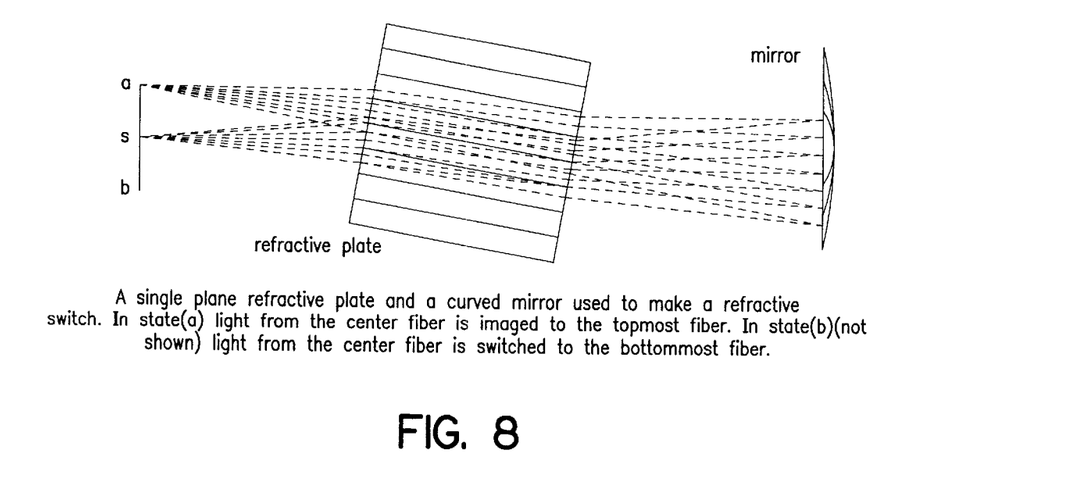
FIG. 8 illustrates a single plane refractive plate and a curved mirror configured to effect a refractive switch as shown in state (a) where light from the center fiber is imaged to the topmost fiber.

FIG. 8 shows the use of a single refractive plate used with a curved mirror to make a 1×2 switch. In state (a) the mirror, as seen from the source, is displaced upwards by an amount (d) as defined belows:

$$d \approx T\theta\left[1 - \frac{1}{n}\right]$$

where T is the thickness of the plate, θ is the tilt angle of the plate (in radians), and n is the index of refraction of the plate. As a result, light from the center-most fiber is imaged on the topmost fiber, which is located a distance 2d above the first fiber. In state (b) (not shown), the apparent position of the mirror is displaced downwards by d, so that the center fiber is imaged on the bottom-most fiber.

As mentioned above, a significant advantage of the opto-mechanical switching device of the present invention is its scalability. For more complex applications than protection switching, such as OXC, it is necessary to scale simple 1×2 switches to larger configurations. While solid-state switches and some opto-mechanical switches are generally scaled by creating tree structures of 1×2 switches, this typically means switch losses are additive. Compared to switches based on an individual lens for each fiber, the present concept can be scaled to 1×N with much greater economy of both cost and insertion loss by simply increasing the number of refractive plates.

Figure 9:
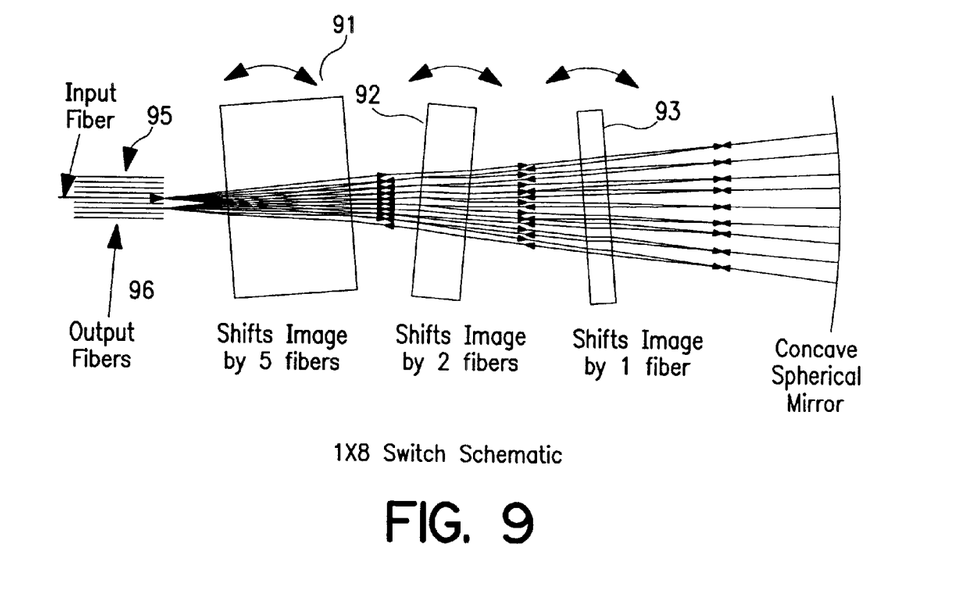
FIG. 9 is a schematic diagram of a preferred embodiment of a 1×8 switch.

FIG. 9 shows how three rotating refractive plates 91, 92, 93 can be configured to effect a 1×8 switch. Note that all fibers are in a compact array 95. The refractive plates 91, 92, 93 are of different thickness, such that together they can shift the position of the return image to any outgoing fiber 96. The thinnest plate 93 moves the return image by one fiber position, the middle plate 92 moves the image by two fibers, and the thickest plate 91 moves the image by five fiber positions. With appropriate binary encoded inputs, the switch is transitioned directly to any output state, in the shortest possible time. Again, the switch is stable in any state with no holding current required.

With N plates, the number of different mechanical states scales as $2^N$, assuming that each plate has two switchable angular positions. Therefore, a 1×16 switch can be fabricated using only four movable refractive plates, while a 1×128 switch would require only 7 moving plates.

The use of position sensors on the glass plates enables digital position sensing with a minimum of translation, since the sensor outputs immediately give the binary code of the state of the switch. For example, in FIG. 9 above, if a plate leaning to the left is defined to be in a "0" position, decoding the positions of the three plates yields "010" for the state shown. If the first fiber position is defined to be "000", it is clear that the sensor state corresponds to connection of the input fiber to the third output.

Figure 10:
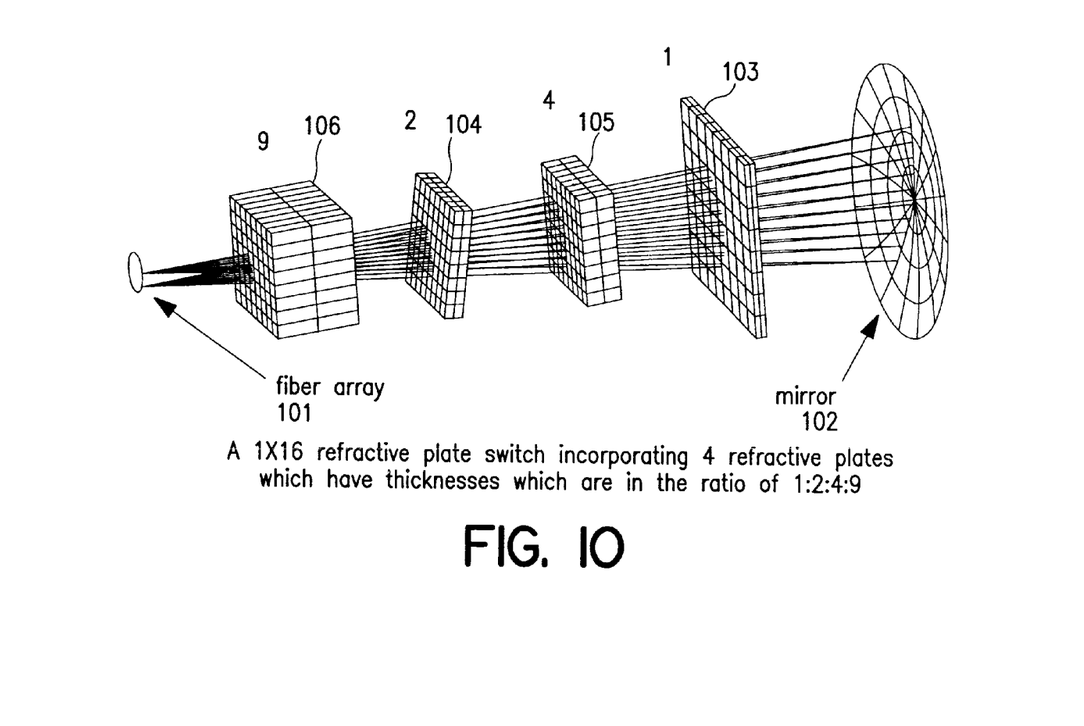
FIG. 10 is a ray diagram of a 1×16 refractive plate switch incorporating four refractive plates which have thicknesses in the ratio of 1:2:4:9.

An analysis of 1×N refractive plate switching will now be undertaken. Several refractive plates can be placed between the source and the curved mirror. If each plate has two positions, then a switch with $2^N$ positions can be realized, where N is the number of refractive plates. For example, consider an array of N+1 fibers used to make a $1\times2^N$ switch where the center fiber is the input, and for each switch state, one of the outer N fibers is selected. If the fiber array consists of fibers with a uniform spacing, then the thicknesses of the N plates in a I×2, switch must satisfy the following:

$$d_n = \begin{cases} 2^{n-1}d_o, 1 \leq n \leq N \\ (2^N + 1)d_o, n = N \end{cases}$$

where $d_o$ is the thickness of the thinnest plate. For example, a 1×16 switch might be made with plates of thicknesses 1,2,4, and 9 mm. The last plate must be 9 instead of 8 mm in order to "skip over" the center-most fiber which is used as an input. FIG. 10 shows the optical modeling of this type of I×16 switch. As shown the switch comprises a fiber array 101, a mirror 102, and refractive plates 103, 104, 105, 106 having a thickness ratio of 1:4:2:9 respectively.

In designing an N plate switch, it is interesting to note that the order of the plates and the relative positions of the plates has no effect on the optical modeling of the switch. This is because each plate changes only the apparent source of the rays, but does not change the angles of the rays. Thus, another advantage of using plane plates is that the displacement of the image is independent of the x,y,z position of each plate. Only the tilts of the plates matter. This is a significant advantage when the switch is thermally cycled.

Figure 11:
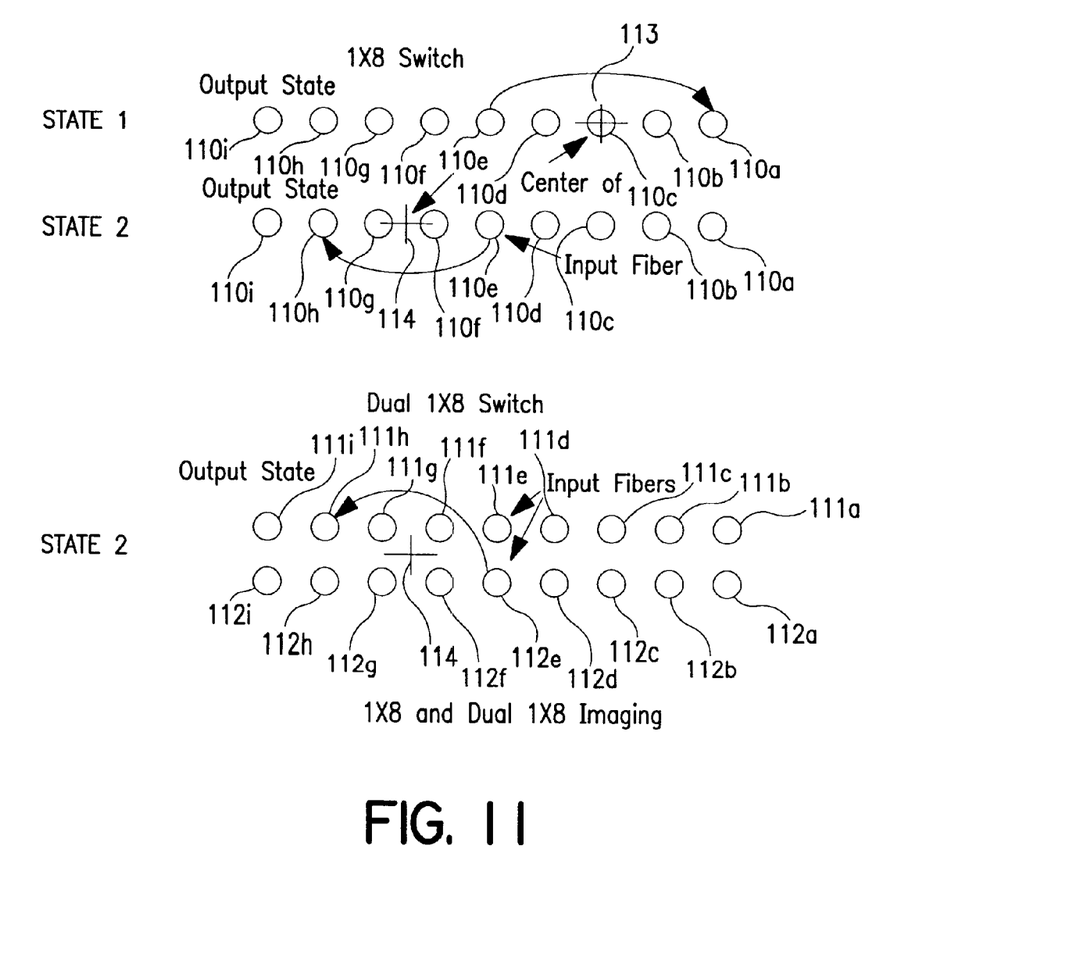
FIG. 11 illustrates 1×8 and dual-1×8 switching in accordance with the present invention.

In addition to scaling in N, additional economy of the optical system can be realized. As in the 1×2 and 2×2, a 1×N switch can become a dual-1×N switch by parallel fiber arrays. Operating through a common mirror and set of refractive plates, a dual-1×8 may be configured as shown in FIG. 11. More specifically, FIG. 11 shows a 1×8 switch in relation to a dual 1×8 switch. The 1×8 switch has a single row of eight fibers 110(a)–(i), while the dual-1×8 switch has two rows of eight fibers 111(a)–(i), 112(a)–(i). Fibers 110(e), 111(e) and 112(e) are input fibers. The 1×8 switch is shown in State 1, in which the center of reflection is at point 113, and State 2, in which the center of reflect is at point 114, while the dual-1×8 switch is shown in just State 2, in which the center of reflection has the same relative position along the row as in State 2 of the 1×8 switch. In State 1, the 1×8 switch couples fiber 110(e) to fiber 110(a) and, in State 2, it couples fiber 110(e) to fiber 110(h). In state 2, the dual 1×8 switch couples fiber 111(e) with fiber 112(h) and fiber 112(e) with fiber 111(h). Such a switch is useful in a transmit/receive implementation where both lines would be switched in unison.

The performance of refractive plate optical switches will now be addressed. Owing to the minimal use of optical elements, refractive plate switches can be built with excellent optical performance and reliability. Traditionally, opto-mechanical switches are superior in insertion loss and crosstalk (extinction ratio or isolation). For example, refractive plate 1×2 switches average only 0.6 dB insertion loss, while larger 1×N switches can be less than 2 dB. Crosstalk and return loss are better than −50 dB. In addition to being achromatic, these switches induce little polarization effects (<0.2 dB). Switching time is <15 milliseconds, and is independent of the size of the switch.

Refractive plate switches preferably are built with a rugged chassis with jeweled bearings and jeweled position stops. Testing has shown no changes over 30 million cycles. Because the refractive plate is mounted in a balanced assembly, there is high immunity to shock and vibration. With multi-mode fibers installed, refractive plate switches have withstood over 1000 G's of shock, optically live with no discontinuities.

What is claimed is:

1. A scalable optical switching device comprising:

at least one input optical fiber;

$2^N$ number of output optical fibers, wherein N>1;

a reflective surface; and

N number of planar refractive plates having relative thicknesses $d_{0, 1, 2 \ldots n}$, wherein N=n, said refractive plates being located between said input optical fiber and said reflective surface, each refractive plate being shiftable between at least a first position and a second position, wherein relative thicknesses $d_{0, 1, 2 \ldots n}$ satisfy the following function:

$$d_n = \begin{cases} 2^{n-1}d_o, 1 \leq n \leq N \\ (2^N + 1)d_o, n = N \end{cases}$$

2. The optical switching device of claim 1, wherein N is three, and the ratio of relative thicknesses is 5:2:1.

3. The optical switching device of claim 1, wherein N is four, and the ratio of relative thicknesses is 9:4:2:1.

4. The optical switching device of claim 1, wherein said at least one input optical fiber is a plurality of input optical fibers.

5. The optical switching device of claim 4, wherein said input and output optical fibers are arranged in two or more parallel rows with at least one input optical fiber being in each row.

6. The optical switching device of claim 5, wherein an input optical fiber of a particular row is optically connected to an output optical fiber of said particular row via said refractive plates and said reflective surface.

* * * * *